United States Patent [19]

Kaiser et al.

[11] Patent Number: 5,137,737
[45] Date of Patent: Aug. 11, 1992

[54] SHELF-STABLE, FILLED PASTA PRODUCTS

[75] Inventors: Debra L. Kaiser, Nanuet; Frank R. Fioriti, Hopewell Junction; Doris C. Volz, North Tarrytown, all of N.Y.

[73] Assignee: Kraft General Foods, Inc., Northfield, Ill.

[21] Appl. No.: 582,724

[22] Filed: Sep. 14, 1990

[51] Int. Cl.5 .......................... A23C 13/16; A23L 1/16
[52] U.S. Cl. ...................................... 426/94; 426/128; 426/131; 426/283; 426/412; 426/557
[58] Field of Search ............... 426/94, 128, 131, 557, 426/451, 578, 583, 582, 412, 407, 283

[56] References Cited

U.S. PATENT DOCUMENTS

| | | | |
|---|---|---|---|
| 3,281,248 | 10/1966 | Fioravanti | 426/283 |
| 3,628,969 | 12/1971 | Vilim et al. | 426/583 |
| 3,969,534 | 7/1976 | Pavey et al. | 426/583 |
| 4,477,478 | 10/1984 | Tiberio et al. | 426/605 |
| 4,493,850 | 1/1985 | Fioravanti | 426/283 |
| 4,659,576 | 4/1987 | Dahle et al. | 426/324 |
| 4,663,178 | 5/1987 | Gehrig et al. | 426/583 |
| 4,689,239 | 8/1987 | Rispoli et al. | 426/578 |
| 4,693,901 | 9/1987 | Hullah | 426/613 |
| 4,756,919 | 7/1988 | Cirigiano et al. | 426/589 |
| 4,873,094 | 10/1989 | Pischke et al. | 426/43 |
| 4,898,744 | 2/1990 | Liggett et al. | 426/94 |

*Primary Examiner*—Donald E. Czaja
*Assistant Examiner*—Mary S. Mims
*Attorney, Agent, or Firm*—Thomas R. Savoie

[57] ABSTRACT

A sour cream-based filling is utilized in retorted filled pasta products such as lasagna, manicotti and ravioli. The filling does not discolor or develop a tough texture during the retort process. The filling contains from 70 to 95% by weight sour cream.

8 Claims, No Drawings

SHELF-STABLE, FILLED PASTA PRODUCTS

BACKGROUND OF THE INVENTION

This invention relates to the production of pre-cooked, shelf-stable, filled pasta products such as ravioli, lasagna, manicotti and the like. More particularly this invention relates to the production of novel, filled, hydrated pasta products which can be thermally processed to render the products commercially-sterile without adversely affecting the color, texture or appearance of the filling.

As used herein, the term "commercially-sterile" means (a) the absence of microorganisms capable of growing in and spoiling the food under normal non-refrigerated storage conditions, and (b) the absence of pathogenic microorganisms capable of proliferating in the food.

In order to facilitate the use of cheese-filled pasta products in the home, pasta product such as lasagna and ravioli have been offered in pre-cooked, shelf-stable or pre-cooked, frozen form, typically packaged with a tomato sauce. The frozen forms of these products have generally been regarded as preferred from a quality perspective since frozen products do not undergo severe heat treatment; however, frozen products are more costly to distribute and store and require relatively long heating times prior to serving. Pre-cooked, shelf-stable products must be retorted in sealed containers under time temperature conditions sufficient to provide a commercially-sterile product. The sealed containers have historically been of the metal can type. More recently there have appeared plastic bowls and trays which are sealed with flexible sheet material. The present invention is applicable to both types of containers.

In the case of cheese lasagna, cheese manicotti and cheese ravioli it has been found that when conventional, ricotta and/or mozzarella cheese fillings are subjected to a retort step (e.g., 240° F. or higher for times of about one hour), the color of the filling changes from white to tan or brown. This darkened color, which seems to result from carmelization of lactose and which may be accompanied by an adverse flavor effect, is a significant negative in the eyes of consumers. It is known that, if food products are formulated to a high-acid pH of below about 4.6, it is possible to achieve commercial sterility in a retort at temperatures of about 185°-200° F.; however, even at these less severe conditions, conventional, ricotta and/or mozzarella cheese fillings still undergo undesirable color darkening.

As discussed in U.S. Pat. No. 3,628,969 to Vilian, various attempts have been made to improve the retort-stability of starch and milk containing food products. Heretofore, however, it has not been possible to stabilize conventional cheese fillings nor have retort-stable substitutes for these fillings been identified.

SUMMARY OF THE INVENTION

Fillings for lasagna, manicotti and ravioli pasta products are usually made from ricotta and/or mozzarella cheese. Cottage cheese has also been utilized as a filling for these filled pasta products. However, none of these cheeses hold up well in a retort sterilization step where they are subjected to high heat for extended periods of time. Ricotta cheese will develop a tofu-like texture and a brown color as a result of retorting. Mozzarella cheese darkens during retorting and, at temperatures of 250° F. or more, loses its stringiness. Cottage cheese develops a brown color and a tough texture as a result of retorting.

According to this invention a new filling has been developed which can withstand retort sterilization, even at high temperature, and which is suitable for use in filled pasta products. The filling of this invention consists essentially of a sour cream base, pregelatinized and cook-up starches, spices and cheese powders and/or flavors. This filling remains white and creamy through either high or low-temperature retorting and can be handled in the same processing equipment utilized for conventional cheese fillings. The filling of this invention is useful in low-acid (i.e., pH above 4.6) filled pasta products as well as their acidified counterparts.

DESCRIPTION OF PREFERRED EMBODIMENTS

The present invention provides a formulation for a cheese-like filling. The filling contains sour cream in an amount of 70 to 95%, preferably 80-95%, by weight to provide the creamy base for the filling. Sour cream is a dairy product resulting from the souring of pasteurized cream by lactic acid producing bacteria. As used herein sour cream is also meant to include the product resulting from the souring of pasteurized cream with suitable acidifiers, with or without the addition of lactic-acid producing bacteria. Sour cream is a colloidal suspension, wherein a high-fat dairy emulsion is entrapped within a fluid, acidified protein-based coagulum. Sour cream typically has a pH of about 4.2 to 4.4.

Typically, an amount of water of from 1 to 20%, preferably 1 to 5%, by weight of the filling is employed to aid in dispersing the dry ingredients such as starches, spices and flavors.

A thickening agent, such as pregelatinized starch, is included in the filling at a level of from 1 to 5%, preferably 2 to 3.5%, by weight to provide initial viscosity to the filling. Suitable pregelatinized starches are Instant Tender-Jel TM 434, a modified waxy corn starch and Hi-Jel TM 90, a tapioca starch, both available from A. E. Staley Mfg. Co., Decatur, Ill. Instant Clear Jel TM and Instant Pure Flow TM are pregelatinized waxy corn starches from National Starch and Chemical Corporation, Bridgewater, N.J., which can also be used in this invention. Thickening agents such as gums are not preferred for use in this invention since they would normally require a separate prehydration step and are more expensive than pregelatinized starch.

Raw or cook-up starch is also included in the filling at a level of from 0.8 to 5%, preferably 1 to 2.5%, by weight. This starch component provides viscosity to the retorted filling. A modified (e.g., crosslinked) food starch such as a waxy maize starch is suitable for use. Starches which are useful in the formulation of cooked pie fillings will be suitable for use in this invention. National 465, a modified (crosslinked) waxy maize starch from National Starch and Chemical Corporation, is an example of such a starch.

Spices and flavors will be included in the fillings of this invention as desired. Sugar, salt, black pepper, garlic, oregano, basil, onion and parsley are among the materials which will commonly be employed. Dried cheese Powders and/or cheese flavors will also be commonly used to enhance the organoleptic properties of the filling. If it is desired to formulate a filling having a pH below 4.6 such that low-temperature retorting can be employed, a food grade acid will be included in the filling formulation. Any food-approved acid, organic or inorganic, which is soluble in water may be used, such as citric, fumaric, lactic, malic, tartaric, sulfuric, hydrochloric and phosphoric acids. The fillings of this invention do not require the presence of any gums. This facilitates the preparation of the filling since a gum prehydration step is not required. The pasta fillings of this invention may be prepared by any conventional blending techniques. The following examples are given to illustrate, but not to limit, the present invention. In these examples, and elsewhere herein, proportions and percentages are expressed as parts by weight unless otherwise indicated.

EXAMPLE 1

An acidified filling (pH about 4.3) was prepared with the following ingredients:

|  | % |
|---|---|
| Sour Cream | 93.4 |
| Pregelatinized Starch (Tender Jel TM 434) | 2.5 |
| Water | 1.0 |
| Salt | 0.5 |
| Spices | 0.4 |
| Starch (National 465) | 1.0 |
| Sugar | 0.55 |
| Cheese Powder | 0.55 |
| Citric Acid (powdered) | 0.10 |

The filling was prepared by dry-blending the dry ingredients. The sour cream and water were mixed in a cheese mixer for 30 seconds after which one-half of the pre-blended dries were added and mixed for five minutes. Thereafter the other half of the dries were added and mixing was continued for 10 minutes longer.

EXAMPLE 2

A filling (pH about 4.7) was prepared, as in Example 1, with the following ingredients:

|  | % |
|---|---|
| Sour Cream | 88.6 |
| Water | 2.1 |
| Cheese Powder | 3.0 |
| Pregelatinized Starch (Tender Jel 434) | 3.0 |
| Starch (National 465) | 1.5 |
| Cheese Powder | 1.0 |
| Sugar | 1.0 |
| Spices | 0.5 |
| Salt | 0.3 |

EXAMPLE 3

The fillings of Example 1 and 2 were each incorporated into lasagna products. About 165 grams of a tomato and meat sauce was placed into single-serving sized plastic trays. A sheet of partially-hydrated pasta was then placed in the tray followed by 60 grams of the sour cream filling. A second sheet of partially-hydrated pasta was placed on top of the filling and then a small amount of a cheese topping was added. The sauce used for the acidified lasagna had a pH of 4.3. The plastic trays were heat-sealed with a plastic-coated aluminum foil and the sealed trays were retorted. Retort conditions for the acidified lasagna were 15 to 18 minutes come-up time to 220° F., 25 to 30 minutes hold at 220° F. and about 30 minutes of cooling with 80° F. water to bring the product temperature below 120° F. Retort conditions for the unacidified lasagna were 18 to 20 minutes come-up time to 250° F., 25 to 30 minutes hold at 250° F. and about 30 minutes of cooling with 80° F. water.

After retorting and cooling, both types of lasagna were examined and it was found that the fillings had retained their white color and were significantly more appealing in appearance and texture than fillings based on ricotta and/or mozzarella cheese. The white color of the fillings of this invention were also retained after the retorted lasagnas were re-heated in either a microwave or conventional oven.

We claim:

1. A shelf-stable, filled, packaged and retort sterilized pasta product wherein the filling is comprised of from 70 to 95% by weight of sour cream, from 1 to 5% by weight of pregelatinized starch, and from 0.8 to 5% by weight of uncooked starch.

2. The filled pasta product of claim 1 wherein the filling contains added food acid.

3. The filled pasta product of claim 2 wherein the filling contains from about 0.05 to 2% citric acid.

4. The filled pasta product of claim 1 wherein the filling is free of added gums.

5. The filled pasta product of claim 1 wherein the filling contains spices and cheese powder.

6. The filled pasta product of claim 1 wherein the pasta is lasagna, manicotti or ravioli packaged in a tomato sauce.

7. The filled pasta product of claim 1 wherein the filling contains from 1 to 20% added water.

8. A shelf-stable filled, packaged and retort sterilized pasta product wherein the filling is comprised of 80 to 95% sour cream, thickening agent, raw starch, cheese powder and spices.

* * * * *